United States Patent
Hsu et al.

(10) Patent No.: US 6,934,420 B1
(45) Date of Patent: Aug. 23, 2005

(54) WAVE IMAGE COMPRESSION

(75) Inventors: Charles C. Hsu, McLean, VA (US); Philip M. Tamburello, Arlington, VA (US)

(73) Assignee: Trident Systems Incorporated, Fairfax, VA (US)

( * ) Notice: Subject to any disclaimer, the term of this patent is extended or adjusted under 35 U.S.C. 154(b) by 712 days.

(21) Appl. No.: 09/740,961

(22) Filed: Dec. 21, 2000

Related U.S. Application Data

(60) Provisional application No. 60/171,509, filed on Dec. 22, 1999.

(51) Int. Cl.[7] .................................................. G06K 9/36
(52) U.S. Cl. ..................... 382/252; 382/264; 348/14.13; 358/426.14
(58) Field of Search ................................ 382/232, 233, 382/234, 235, 243, 244, 245, 246, 247, 248, 251, 252, 253, 240, 100, 236, 250; 704/203, 205, 229, 230, 501, 504; 709/247

(56) References Cited

U.S. PATENT DOCUMENTS

| | | | | |
|---|---|---|---|---|
| 5,315,670 A | * | 5/1994 | Shapiro | 382/240 |
| 5,734,755 A | * | 3/1998 | Ramchandran et al. | 382/250 |
| 5,802,481 A | | 9/1998 | Prieto | 702/190 |
| 5,819,215 A | * | 10/1998 | Dobson et al. | 704/230 |
| 5,825,935 A | | 10/1998 | Murakoshi | 382/248 |
| 5,835,034 A | | 11/1998 | Seroussi et al. | 341/65 |
| 5,867,602 A | * | 2/1999 | Zandi et al. | 382/248 |
| 6,018,596 A | | 1/2000 | Wilkinson | 382/260 |
| 6,141,446 A | * | 10/2000 | Boliek et al. | 382/233 |
| 6,353,685 B1 | * | 3/2002 | Wu et al. | 382/250 |
| 6,546,143 B1 | * | 4/2003 | Taubman et al. | 382/240 |
| 6,594,394 B1 | * | 7/2003 | Stromberg et al. | 382/232 |
| 6,618,507 B1 | * | 9/2003 | Divakaran et al. | 382/236 |

* cited by examiner

*Primary Examiner*—Bhavesh M. Mehta
*Assistant Examiner*—Abolfazl Tabatabai
(74) *Attorney, Agent, or Firm*—Hunton & Williams LLP

(57) ABSTRACT

A method of image compression comprises the steps of recursively transforming a image using a Discrete Wavelet Transform. This creates a plurality of levels including at least a first level, multiple intermediate levels, and a low-low pass subband of the last level. The transformed image at each level is quantized, and datapacking the quantized image is performed. The step of datapacking further includes, encoding of the first level using adaptive run length of zero cofficients; encoding of the intermediate levels using run-length coding of zero coefficients and a predetermined two-knob huffman table for non-zero coefficients and encoding of the low-low pass subband using a low frequency packing algorithm.

21 Claims, 19 Drawing Sheets

Q=fix(abs(W)./cr).*sign(W)

W*=(abs(Q)+0.5).*cr.*(sign(Q))

| | |
|---|---|
| Q: | Quantized coefficient |
| W: | Original wavelet coefficient |
| CR: | User defined compression parameter |
| W*: | De-quantized coefficient |
| Fix: | Truncates value |
| Abs: | returns magnitude of value |
| Sign: | Return the sign of the number. Returns zero if the value is zero |

Input Data:

Output Data:

| Value | Codeword |
|---|---|
| 0 | 0 |
| 1 | 100 |
| -1 | 101 |
| 2 | 1100 |
| -2 | 1101 |
| 3 | 11100 |
| -3 | 11101 |
| 4 | 111000 |
| -4 | 111001 |
| 5 | 1110100 |
| -5 | 1110101 |
| 6 | 1110110 |
| -6 | 1110111 |
| 7 | 11111000 |
| -7 | 11111001 |
| 8 | 111110100 |
| -8 | 111110101 |
| 9 | 111110110 |
| -9 | 111110111 |
| 10 | 111111000 |
| -10 | 111111001 |
| 11 | 111111010 |
| -11 | 111111011 |
| 12 | 1111111000 |
| -12 | 1111111001 |
| 13 | 1111111010 |
| -13 | 1111111011 |
| 14 | 1111111100 |
| -14 | 1111111101 |
| 15 | 1111111110 |
| esc | 1111111111 |

FIG. 10

| Value | Code Word |
|---|---|
| 0 short | 00 |
| 0 long | 01 |
| -1 | 100 |
| 1 | 101 |
| -2 | 1100 |
| 2 | 1101 |
| -3 | 11100 |
| 3 | 11101 |
| -4 | 111100 |
| 4 | 111101 |
| -5 | 1111100 |
| 5 | 1111101 |
| -6 | 1111110 |
| escape | 1111111 |

FIG. 14

| DC1 | $AC_1 1$ | $AC_1 2$ | $AC_1 3$ | $AC_1 4$ | ... | $AC_1 10$ |
|-----|----------|----------|----------|----------|-----|-----------|
| DC2 | $AC_2 1$ | $AC_2 2$ | $AC_2 3$ | $AC_2 4$ | ... | $AC_2 10$ |
| DC3 | $AC_3 1$ | $AC_3 2$ | $AC_3 3$ | $AC_3 4$ | ... | $AC_3 10$ |
| DC4 | $AC_4 1$ | $AC_4 2$ | $AC_4 3$ | $AC_4 4$ | ... | $AC_4 10$ |
| DC5 | $AC_5 1$ | $AC_5 2$ | $AC_5 3$ | $AC_5 4$ | ... | $AC_5 10$ |
| DC6 | $AC_6 1$ | $AC_6 2$ | $AC_6 3$ | $AC_6 4$ | ... | $AC_6 10$ |
| DC7 | $AC_7 1$ | $AC_7 2$ | $AC_7 3$ | $AC_7 4$ | ... | $AC_7 10$ |
| DC8 | $AC_8 1$ | $AC_8 2$ | $AC_8 3$ | $AC_8 4$ | ... | $AC_8 10$ |
| DC9 | $AC_9 1$ | $AC_9 2$ | $AC_9 3$ | $AC_9 4$ | ... | $AC_9 10$ |

FIG. 15

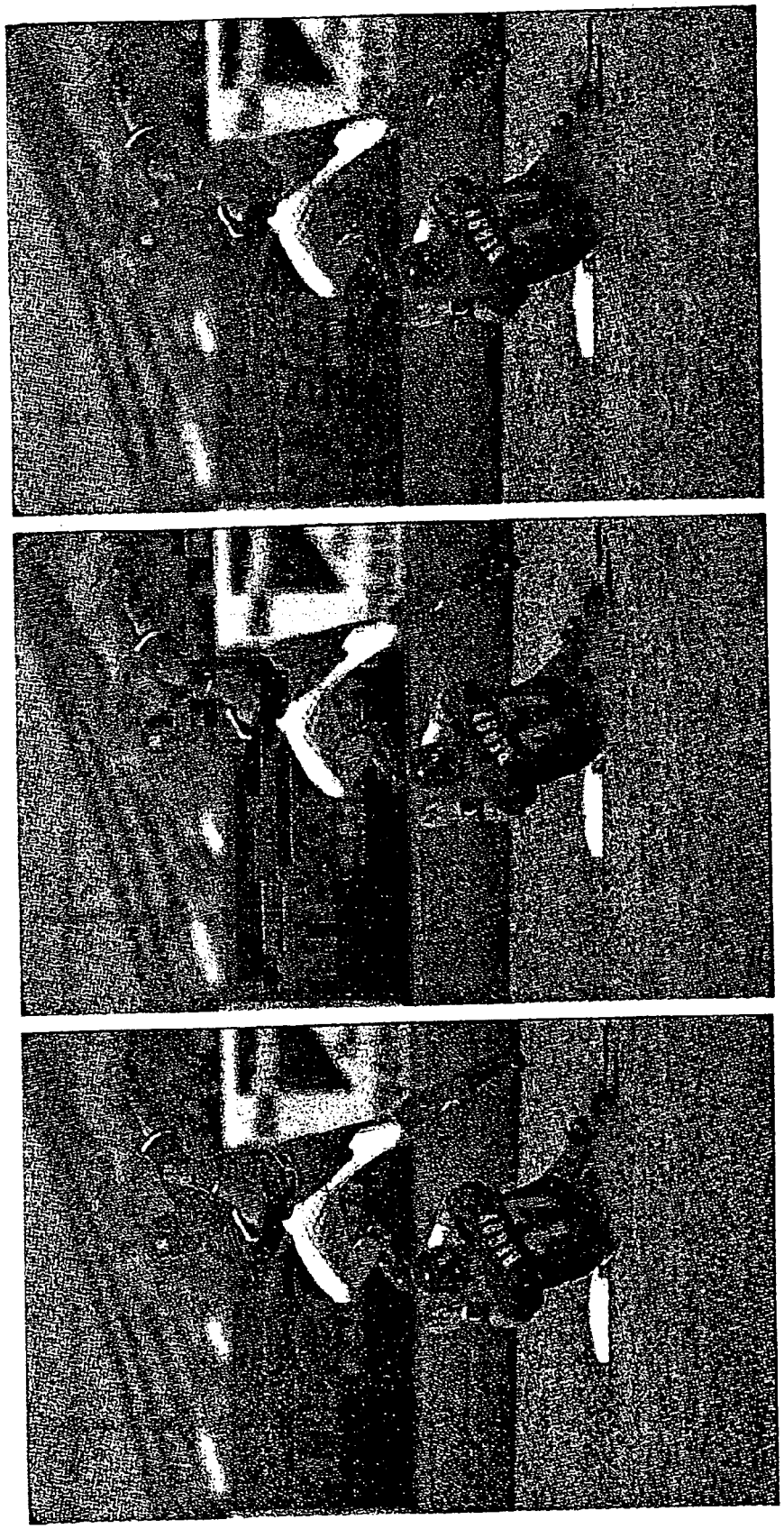
FIG. 18A Original
FIG. 18B JPEG 77:1
FIG. 18C 162:1

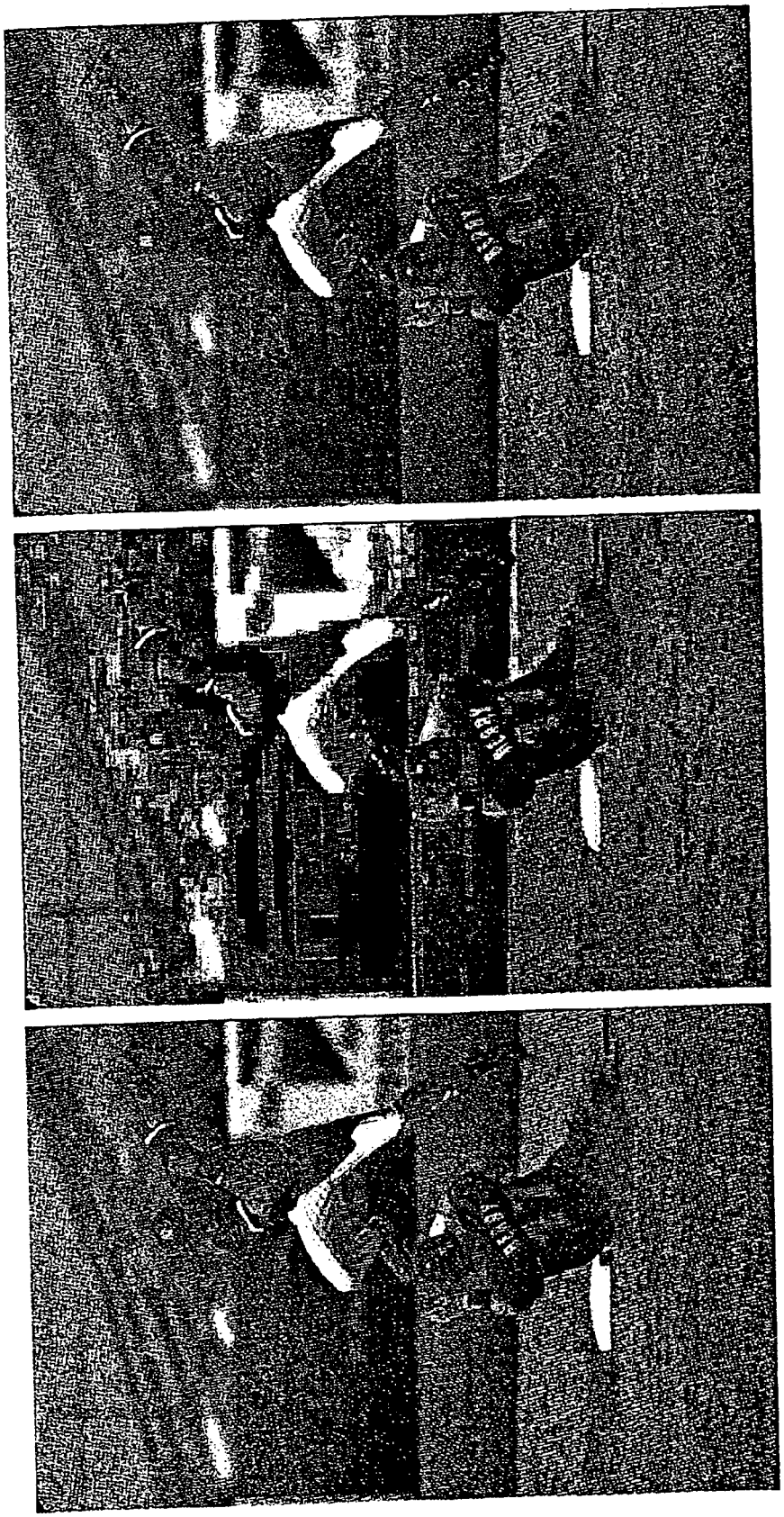
FIG. 19A Original
FIG. 19B JPEG 163:1
FIG. 19C 162:1

WAVE IMAGE COMPRESSION

CROSS REFERENCE TO RELATED APPLICATIONS

This application claims the benefit of U.S. Provisional Application Ser. No. 60/171,509, filed on Dec. 22, 1999.

FEDERALLY SPONSORED RESEARCH AND DEVELOPMENT

This invention was made in part with government support under contract no. DAAB07-97-D-H754 awarded by the U.S. Army. The U.S. Government has certain rights in this invention.

TECHNICAL FIELD OF THE INVENTION

The present invention relates to the field of digital data compression and decompression in particular to a compression and decompression method that implements combined discrete wavelet transformation, and a method of data packing.

BACKGROUND OF THE INVENTION

The use of digitized multimedia, such as motion video and still images, has increased the demand on microprocessors and available bandwidth. The use of World Wide Web browsers as graphical user interfaces and electronic commerce on the Internet has increased the need for graphical images that are visually appealing and are of high resolution. Unfortunately, high image quality creates a demand for increased storage space for digital data. Industry has recognized the need for compression of the digital data to help reduce the problem. Compression is a process intended to yield a compact digital representation of a signal. In the cases where the signal is defined as an image, the problem of compression is to minimize the number of bits needed to digitally represent the image. There are many applications that benefit when image signals are available in compressed form, such as digital photography, electronic commerce, digital video processing and archiving digital images for on-line catalogs. Without compression, most digital information and transmission through the normal limited bandwidth channels is difficult or infeasible for practical use. For example, consider the case of facsimile transmission. Typically, an 8.5×11 inch page is scanned and digitized at 300 dots per inch, thus resulting in 8.5×11×300×300–8415000 bits. Transmitting this data via a low-cost 14.4 Kbps modem could require 9.74 minutes.

Compression of digital data is the process of representing this data using as few bits or bytes as possible. Generally, there exist two types of image compression for digital data—lossless and lossy. Lossless compression does not lose any data in the compression and allows image data to be stored using less memory, such as Random Access Memory (RAM), than an uncompressed image with the ability to restore the original data exactly. Lossy compression further reduces the amount of needed memory, but does not guarantee exact restoration of the original data. Existing technology for lossless compression, however, may not allow for high compression ratios. If the electronic data signal is an image, the differences between the original and the lossy compressed restoration may not even be visually noticeable for low compression levels using existing compression technology.

There exist several lossy compression methods available for image compression. The Joint Photographic Experts Group (JPEG) has provided one of the most popular still image compression technologies available today. Other file formats include PCX, GIF and BMP. The IS 10918-1 (ITU-T.81) standard for image compression is the result of JPEG and is usually referred to as the JPEG standard. This standard combines the discrete cosine transform (DCT) and extensive Huffman tables to produce a compression algorithm. Since JPEG has an underlying DCT based technology, it operates on eight by eight blocks of pixels. Although JPEG is popular, one known problem is that, as the compression level increases, the image quality worsens and distortion grows in these blocks individually. This problem leads to a block effect that introduces edges into the image, which is normally detected as jagged edges or maybe a blurring to the observer of the decompressed image. Because storage space or bandwidth may be limited, additional space or bandwidth is costly or unavailable, high compression, (such as 100:1), is generally preferred than lower compression of data Since the development of digital signal processing in the early 1980's, a digital form of wavelet transform called Discrete Wavelet Transform (DWT) has become an important tool for image processing and image compression. DWT is a lossless transform, which is used to form an orthonomal basis of some, and a dilated master function over a range of, shift and dilation parameters. The principle behind the wavelet transform is to hierarchically or recursively decompose the input signals into a series of successively lower resolution reference signals and their associated detail signals. At each level, the reference signals and detailed signals contain the information needed for reconstruction back to the next higher resolution level. Onedimensional DWT (1-D DWT) processing can be described in terms of a Finite Impulse Response (FIR) filter bank, wherein an input signal is analyzed in both low and high frequency subbands.

A separable two-dimensional DWT process is a straightforward extension of 1-D DWT. Specifically, in the 2-D DWT process, separable filter banks are applied first horizontally and then vertically. Referring to FIG. 1, the 2-D DWT process decomposes an image into a reference signal, and three detail signals. The signals from the filter bank comprising two filters, first horizontally then vertically, gives rise to an analysis in four frequency subbands: subband LL, horizontal low-vertical low as known as a reference signal; subband LH, horizontal low-vertical high; subband HL, horizontal high-vertical low; and subband HH, horizontal high-vertical high. Each resulting band is encoded according to its unique information content for transmission from a coding station to a receiving station. Constraints, however, exist on how filters can be designed an/or selected, including the need to output perfect reconstructions, the finite-length of the filters and a regularity requirement that the iterated low pass filters involve convergence to continuous functions.

Thus what is needed is a method and apparatus of compressing and decompressing image data that overcomes the problems in prior art. There is also a need to perform high compression of data and at the same time redisplay the underlying image at high visual quality.

SUMMARY OF THE INVENTION

In view of the foregoing the present invention is directed to a system and method of image compression.

In a first embodiment of the present invention, a method of image compression, comprises the steps of recursively transforming an image using a Discrete Wavelet Transform.

This creates a plurality of levels including at least a first level, multiple intermediate levels, and a low-low pass subband of the last level. The transformed image at each level is quantized, and datapacking the quantized image is performed. The step of datapacking further includes, encoding of the first level using adaptive run length coding of zero coefficients combined with Huffman codes; encoding of the intermediate levels using run-length coding of zero coefficients and a predetermined two-knob huffman table for non-zero coefficients and encoding of the low-low pass subband using a low frequency packing algorithm.

In another embodiment of the invention, an encoder of compressing input data from an image comprises a two-dimensional discrete wavelet filter for transforming the input data into plurality of coefficients. The filter forms a first level, intermediate levels, and a low-low subband of a highest level of transformation. A quantizer maps the coefficients into discrete regions by a predetermined compression parameter. A datapacker compresses the mapped coefficients. The datapacker encodes a plurality of zero coefficients at the first level by adaptive run length coding, a plurality of non-zero coefficients at the intermediate levels by a two-knob Huffman coding and the low-low subband at the highest level by low frequency coding.

These and other objects, features and advantages of the present invention will be apparent upon consideration of the following detailed description thereof, presented in connection with the following drawings in, which like reference numerals identify the elements throughout.

BRIEF DESCRIPTION OF THE DRAWINGS

FIG. 10 is an embodiment of a huffman table according to the present invention;

FIG. 14 is an embodiment of a two-knob huffman table according to the present invention;

FIG. 15 is a diagram of a low-low pass subband and labeling convention according to the present invention;

FIGS. 18A–18C are examples of the compressed images using JPEG and the present invention at a moderate compression level illustrating the blocking effect; and FIGS. 19A–19C are examples of the compressed images using JPEG and the present invention illustrating at a relatively high compression level illustrating the blocking effect.

DETAILED DESCRIPTION OF THE INVENTION

There is shown in FIGS. 1–16 an illustration of an embodiment of the present invention, a method and apparatus for processing a image data.

Figure 1:
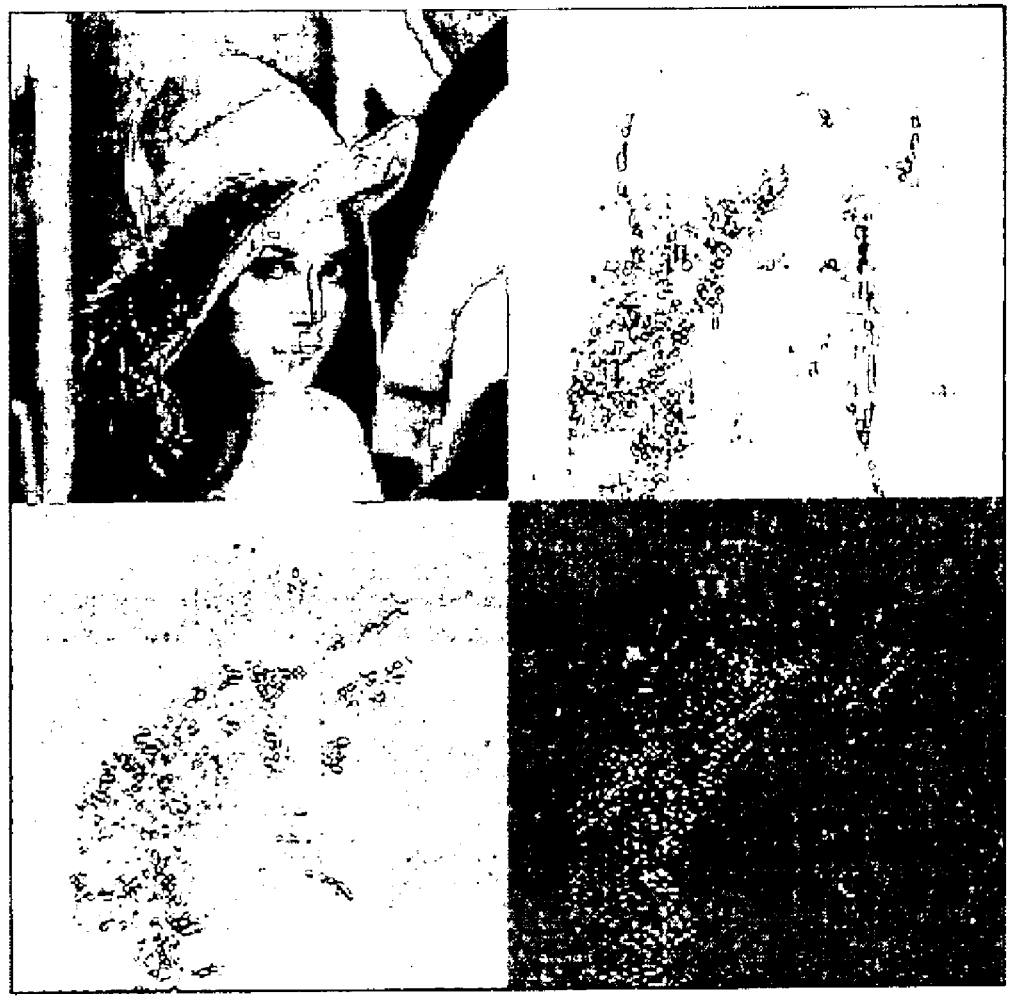
FIG. 1 is a diagram illustrating divided frequency bands from a process of two-dimensional discrete wavelet transform.
Figure 2:
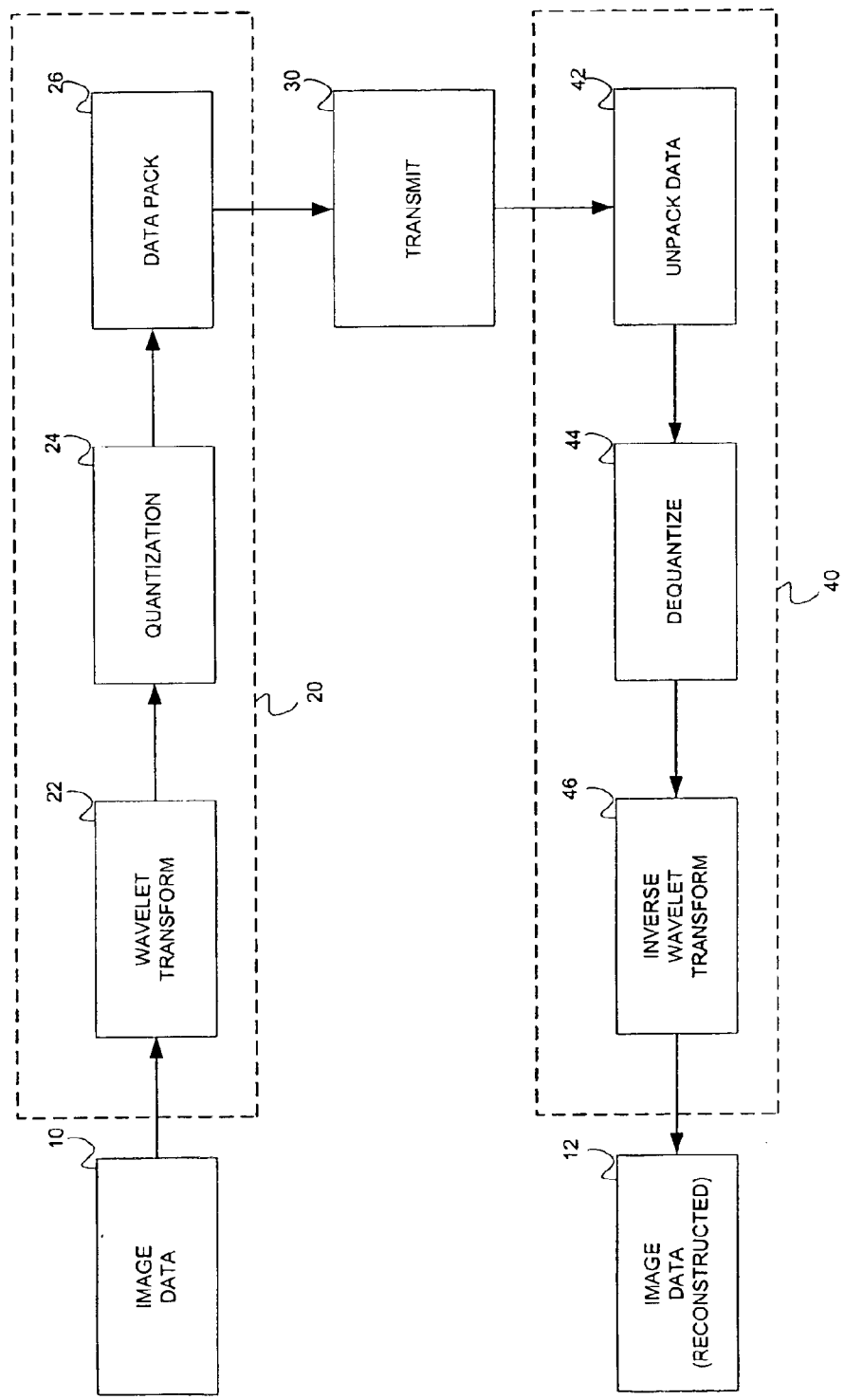
FIG. 2 is a block diagram of a coder and decoder according to the present invention.

Referring to FIG. 2, the method of the embodiment uses three steps for the encoder of image compression 20—forward wavelet transform 22, quantization 24, and data packing 26. Each of the steps will be described in detail herein.

In a first embodiment of the invention, digital image data 10 having pixel values is provided to a wavelet transform process 22. Wavelet transform process 22 uses a multiple level wavelet transform, utilizing symmetric biorthogonal seven and nine tap filters. Decimation and interpolation procedures are incorporated in the wavelet transform. This allows the forward and inverse transform to be done with about half the number of multiply adds. Also, the image is mirrored at the edges before transformation, providing better image reconstruction from the quantized wavelet coefficients. Wavelet data is the output data of wavelet transform process 20.

Next a quantization step 24 is performed on the wavelet data in which a uniform scalar quantization technique employs a dead zone around zero. According to the present invention, this technique prepares the structure of the wavelet data, allowing efficient compression. The dead zone at zero helps to increase compression without introducing large amounts of distortion. The compression level is adjusted by a user-controlled parameter CR that affects quantization step 24.

The quantized wavelet coefficients are provided into a datapack step 26. According to the present invention, datapack step 26 compresses the quantized wavelet coefficients using different techniques. The inventive techniques use adaptive run length coding, Huffman coding, and low frequency data packing. The specific type of technique for encoding the wavelet coefficients is applied for the resolution level of wavelet coefficients being compressed.

The decompression procedure 40 is the inverse of the compression procedure 20. The compressed data is provided to a unpack step 42. This step includes the lookup of Huffman words, the decoding of the run length codes, and other data unpacking techniques. The unpack step 42 reproduces the quantized wavelet coefficients. The quantized wavelet coefficients are then provided to a de-quantization step 44. De-quantizion step 44 involves the inverse process of the quantization step 24.

The final step in the decompression procedure 40 is to inverse wavelet transform 46 the dequantized wavelet coefficients. Inverse wavelet transformation step 46 produces the pixel values that are used to create the visual image. Some normalization of the pixel values is performed due to the rounding and quantization error involved in the forward wavelet transform step 22 and inverse wavelet transform step 46. The reconstructed image data 12 is then displayed to the user by any known image display hardware for digital data.

Forward Discrete Wavelet Transform and Inverse Discrete Transform

Forward wavelet transform 22 hierarchically decomposes the input signals into a series of successively lower resolution reference signals and their associated detail signals. At each resolution level, the reference signals and detail signals contain the information needed to be reconstructed back to the next higher resolution level. The one-dimensional DWT (the separable 2-D case is a straightforward extension) may be described in terms of the filter bank. DWT is related to Sub-band Coding & Quadrature Mirror Filter (QMF), and to the Laplacian Pyramid (LP) in Computer Vision.

$H_0$ is denoted as a low pass filter and $H_1$ is denoted as a high pass filter in the "Analysis" process. In the Synthesis operations, $G_0$ is denoted as a low pass filter and $G_1$ as a high pass filter. The filtering function in digital signal processing is a convolution operation. The basic Multiple Resolution Analysis (MRA) in terms of QMP is used in the present invention. An input signal F(z) is input to the analysis low pass filter $H_0(z)$ and the analysis high pass filter $H_1(z)$. The odd samples of the filtered outputs may be discarded, corresponding to decimation by a factor of two. The decimation outputs of these filters constitute the reference signal $r_1(z)$ and detailed signal $d_1(z)$ for a one level decomposition. For synthesis process (reconstruction), interpolation by a factor of two is performed and followed by filtering using the low pass and high pass synthesis filter $G_0(z)$ and $G_1(z)$. Constraints on filter design include perfect reconstruction (lossless in terms of image quality), finite-length (finite number of taps in the filter with no feedback), and regularity (the filter convolved upon itself will converge) so that the iterated low pass filters may converge to continuous functions.

In one embodiment, to provide a lossless QMF design, the discrete filter bank theory to the scaling $H_0$ filter is applied via the standard z-transform:

$$H_0(z) = \sum_{k=0} c_k z^{-k}$$

and likewise a wavelet $H_1$ filter:

$$H_1(z) = \sum_{k=0} d_k z^{-k}.$$

Applying the theory of filter banks, it is noted that to eliminate aliasing, the following relationship must be satisfied:

$$G_1(z)=(-1)^{n+1}H_0(z)$$

$$H_1(z)=(-1)^n G_0(z)$$

The following equations may be obtain by appropriate substitution of the above equations:

$$F(z)=F^\wedge(z)$$

$$F^\wedge(z)=\tfrac{1}{2}\{F(z)H_0(z)+F(-z)H_0(-z)\}G_0+\tfrac{1}{2}\{F(z)H_1(z)+F(-z)H_1(-z)\}G_1$$

Figure 5:
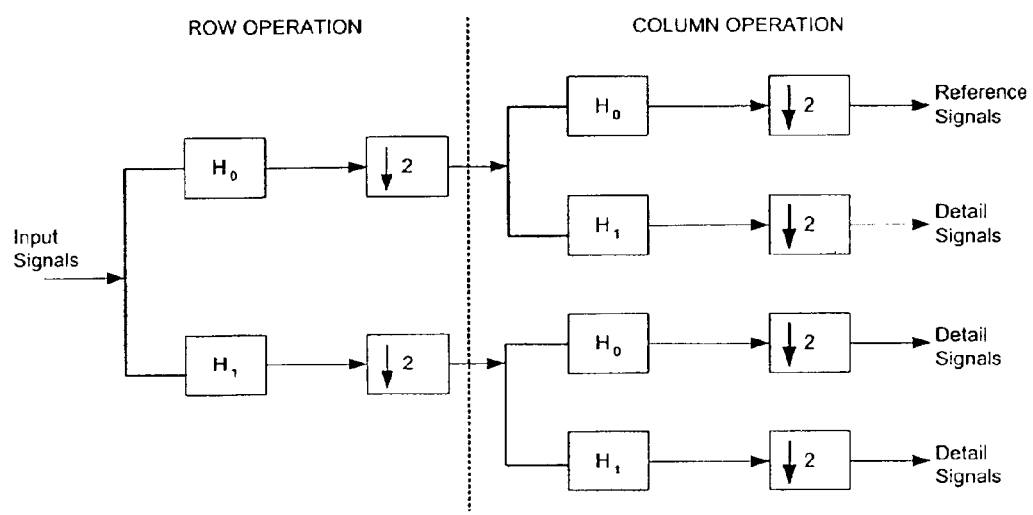
FIG. 5 is schematic diagram showing analysis of a Discrete Wavelet Transform according to the present invention.
Figure 6:
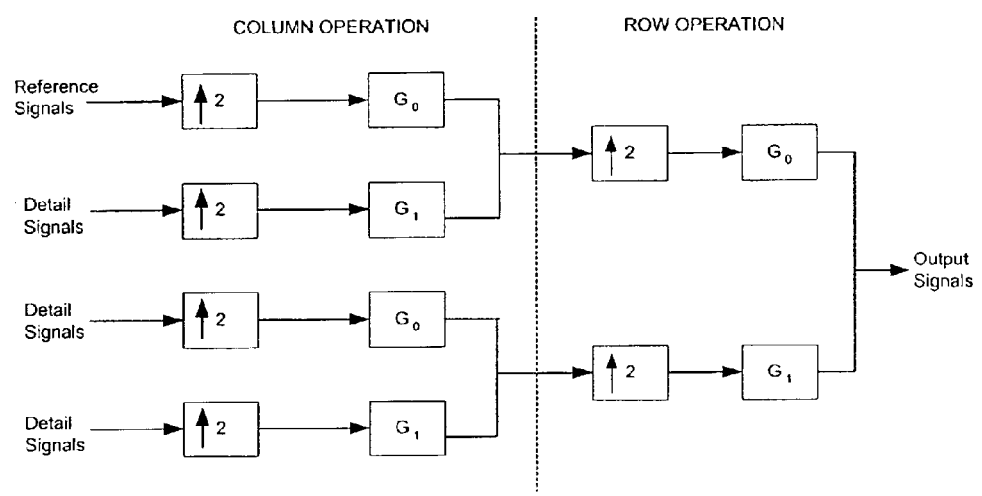
FIG. 6 is a schematic diagram showing synthesis of a Discrete Wavelet Transform according to the present invention.

As known in the art, the 1-D DWT may be extended to two-dimensional DWT (2-D DWT). The analysis of 2-D DWT is shown in FIG. 5, and the synthesis of twodimensional DWT is shown in FIG. 6. In a 2-D DWT, separable filter banks are applied first horizontally and then vertically. Application of a filter bank comprising two filters, first horizontally then vertically, gives rise to an analysis in four frequency bands; horizontal low-vertical low, horizontal low-vertical high, horizontal high-vertical low, horizontal high-vertical high. Each resulting band is encoded according to its own statistics for transmission from a coding station to a receiving station. The following equations are used to develop the filter.

$$F_{a1}=x(z)H_0(z)$$

$$F_{a2}=x(z)H_1(z)$$

$$F_{a3}=\tfrac{1}{2}\{x(z^{1/2})H_0(z^{1/2})+x(-z^{1/2})H_0(-z^{1/2})\}$$

$$F_{a4}=\tfrac{1}{2}\{x(z^{1/2})H_1(z^{1/2})+x(-z^{1/2})H_1(-z^{1/2})\}$$

$$F_{a5}=\tfrac{1}{2}\{x(z)H_0(z)+x(-z)H_0(-z)\}$$

$$F_{a6}=\tfrac{1}{2}\{x(z)H_1(z)+x(-z)H_1(-z)\}$$

$$y(z)=\tfrac{1}{2}G_0\{x(z)H_0(z)+x(-z)H_0(-z)\}+\tfrac{1}{2}G_1\{x(z)H_1(z)+x(-z)H_1(-z)\}.$$

The present invention includes performing a DWT on an image using computation methods such as convolving the image and the filters. Discrete convolution is a multiply and add procedure using the coefficients of the filter, and the image pixel values. Due to the convolution, there is a transient effect that occurs at the image edges. To reduce this effect, the present invention pads the image at all edges. This padding is a mirror reflection of the image. This padding helps prevents the transient affect from distorting the image when performing the inverse DWT in step 46 on the de-quantized coefficients. Without quantization, the wavelet transform is a lossless function, but the distortion caused by the quantization can cause undersized losses in image reconstruction. Padding advantageously reduces this effect.

In one embodiment, the DWT transform process is simplified due to compression algorithm 20 using symmetric, odd length filters on image data 10 that is constrained to have dimensions that are multiples of two raised to the number of wavelet levels ($2^{levels}$). Because the output for each pixel occurs when the filter is centered on that pixel, the number of pixels that need to be mirrored is equal to the length of the filter minus one, divided by two.

The mirroring of a row of image pixels is illustrated below. If an image has a row of pixels, $a_0$ to $a_{n-1}$, and is convolved with a filter of length 5, then the mirrored row would be symbolically denoted as the following:

$a_2\ a_1|a_0\ a_1\ a_2\ a_3\ \ldots\ a_{n-3}\ a_{n-2}\ a_{n-1}|a_{n-2}\ a_{n-3}$ where n is the number of pixels.

A convolution of a row with a filter of length 3, is demonstrated as below:

If the filter is defined by F=[A B C] and the row is defined by row=[1 2 3 4 5 6 7 8] then the mirrored row should be constructed as 2|1 2 3 4 5 6 7 8|7. After convolution, the resulting coefficients are as follows:

A2+B1+C2, A3+B2+C1, A4+B3+C2, A5+B4+C3, A6+B5+C4, A7+B6+C5, A8+B7+C6, A7+B8+C7 where the transient coefficients are not included. Only the results of the convolution when the filter is centered on the pixel are kept.

After performing the convolution, a decimation operation is performed. This decimation operation reduces the number of data values by a factor of two by selecting every other coefficient. Because half of the coefficients are discarded, it is advantageous to skip the operations that produce these values. Therefore, when the convolution is performed, only every other data point is calculated and the decimation is performed at the same time. In the above example, after decimation, the result would be as follows: A2+B1+C2, A4+B3+C2, A6+B5+C4, A8+B7+C6.

Referring to FIG. 5, the forward wavelet transform performs the low pass and high pass functions first on the rows, and then the columns of the image data The low pass decimation is performed by retaining only the odd numbered elements, then the high pass decimation is performed by keeping only the even numbered elements. After performing both the row and column operations, there will be four frequency subbands. Each of these subbands will have one-fourth the elements of the original data set. This is because of decimation after both the row and column operations.

Figure 4:
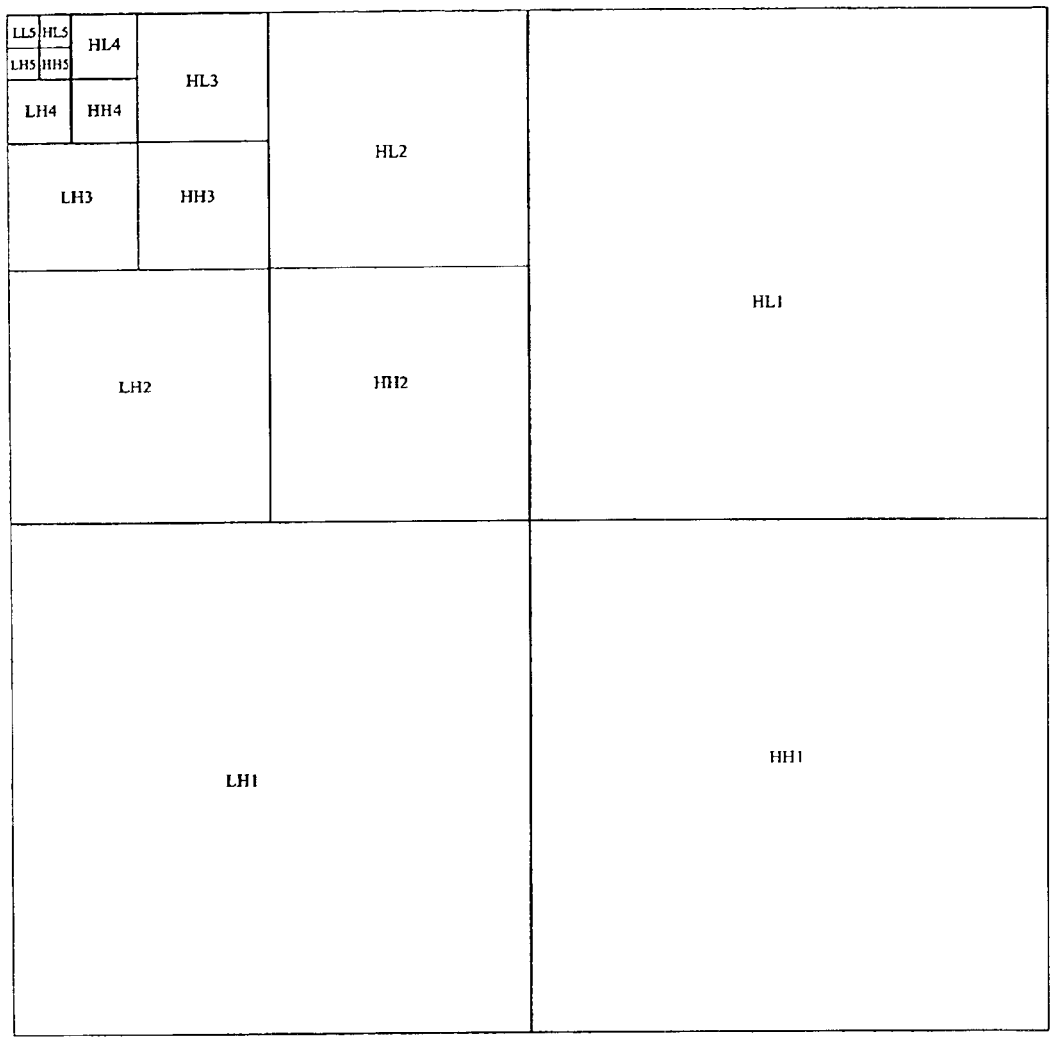
FIG. 4 is a diagram showing wavelet subbands according to the present invention.

FIGS. 4–6 illustrates the steps to perform the forward wavelet transform 22 and inverse wavelet transform 46. The mirrored image, input signal, is first convolved with a low pass filter, then decimated. The mirrored image is also convolved with a high pass filter and decimated. This procedure is repeated with each of the results of this stage. This produces a one level wavelet transform. To create more wavelet levels, the low-low pass quadrant is used as the new input, and the procedure is repeated. As shown in FIG. 4, there are five wavelet levels preformed that produces 16 subbands. It is appreciated that less than five or more than five levels may be performed and are considered part of the invention.

The step of inverse wavelet transform 46 is the reverse process of the forward wavelet step. First, column interpolation is performed on the input signals by inserting zeros into the data. Then, the signals are convolved with the low pass and high pass filters, and then the results are summed. Row interpolation is performed, and then low pass and high pass filtering is performed, and the results are summed. This is performed for one level of the inverse wavelet transform. For additional levels, this result is treated as a low-low pass subband, and combined with the next level high-low, low-high, high-high, subbands.

In the embodiment shown, the decimation and interpolation steps are included in the forward and inverse convolution thereby reducing the number of multiply and adds required. The decimation procedure is performed by skipping the multiply and adds in pixel locations that would be discarded to decimation. The interpolation procedure is performed by dropping some of the filter coefficients due to the convolution taking place on an interpolated data set that has zeros for every other value. This arrangement advantageously offers much computational savings.

Figure 7:
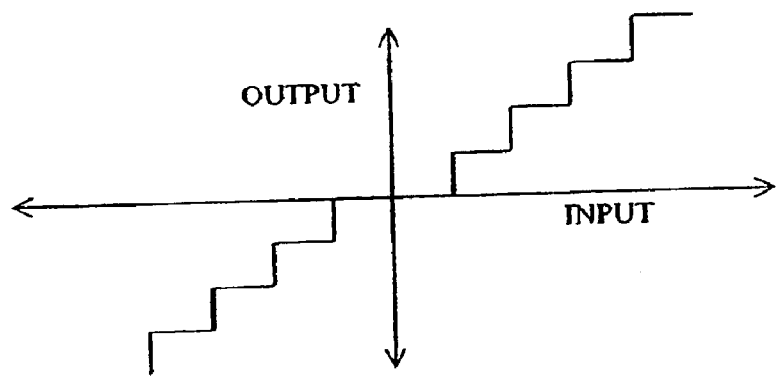
FIG. 7 is a diagram of a quantized image signal according to the present invention.
Figure 8:
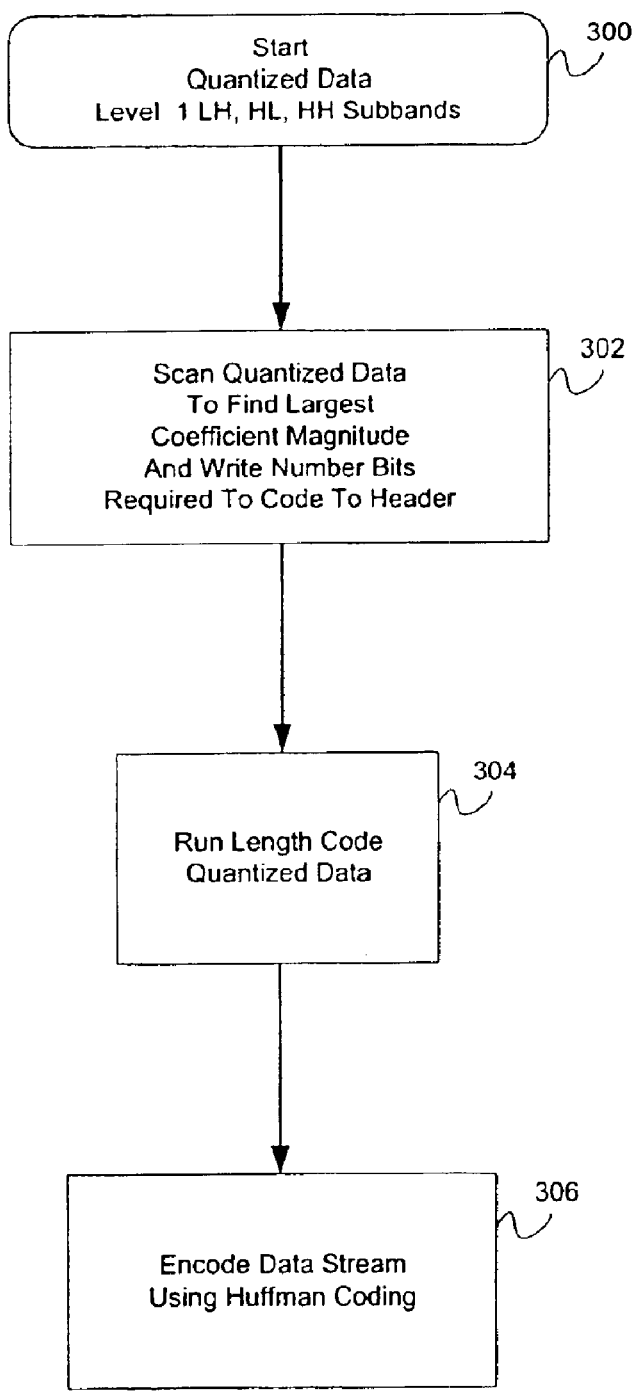
FIG. 8 is a flow chart an embodiment of a method of adaptive run length coding according to the present invention.

Referring to FIGS. 2 and 7, quantization step 24 includes the process of converting a continuous signal into a discrete, digital representation of that signal. Choosing how to map the continuous signal to a discrete signal depends on the application of the image use. In one embodiment, for low distortion and high quality reconstruction, the quantization step 24 is constructed in such a way to take advantage of the signal's characteristics. Scalar quantization is herein defined that each wavelet coefficient is quantized separately, one at a time. Uniform quantization is herein defined that the structure of the quantized data is similar to the original data In general, quantizing wavelet coefficients for image compression involves a compromise between low signal distortion, and the ability to produce quantized coefficients that are easily compressed. The method of the present invention advantageously employs the probability distribution of the wavelet coefficients to enables such high compression of the image.

The method of compression includes uniform scalar quantization. The resolution of quantization is controlled by user-defined parameter CR. The larger the parameter, the more coarsely the wavelet coefficients are quantized. This coarse quantization includes more distortion to the signal, but allows higher compression of the data because the dynamic range of the quantized coefficients is reduced. Quantization step 24 used in compression method of the present invention is a uniform quantization with a dead zone centered at zero. This means that the zero bin is twice the size of all other bins. The uniform quantization is performed by first dividing the wavelet coefficients by user-defined parameter CR. The new values are truncated to produce a rounding zero effect, regardless if the value is positive or negative.

Referring to FIG. 2, dequantize step 44 is performed after step 42 of unpacking the data. First 0.5 is added to the quantized wavelet coefficient value. This shifting of the quantized value to the middle of the bin is used to prevent excessive rounding towards zero. This shifted value is then multiplied by user-defined parameter CR. In de-quantize step 44, if the quantized coefficient value is zero, then the value after dequantization will also be zero.

Figure 3:
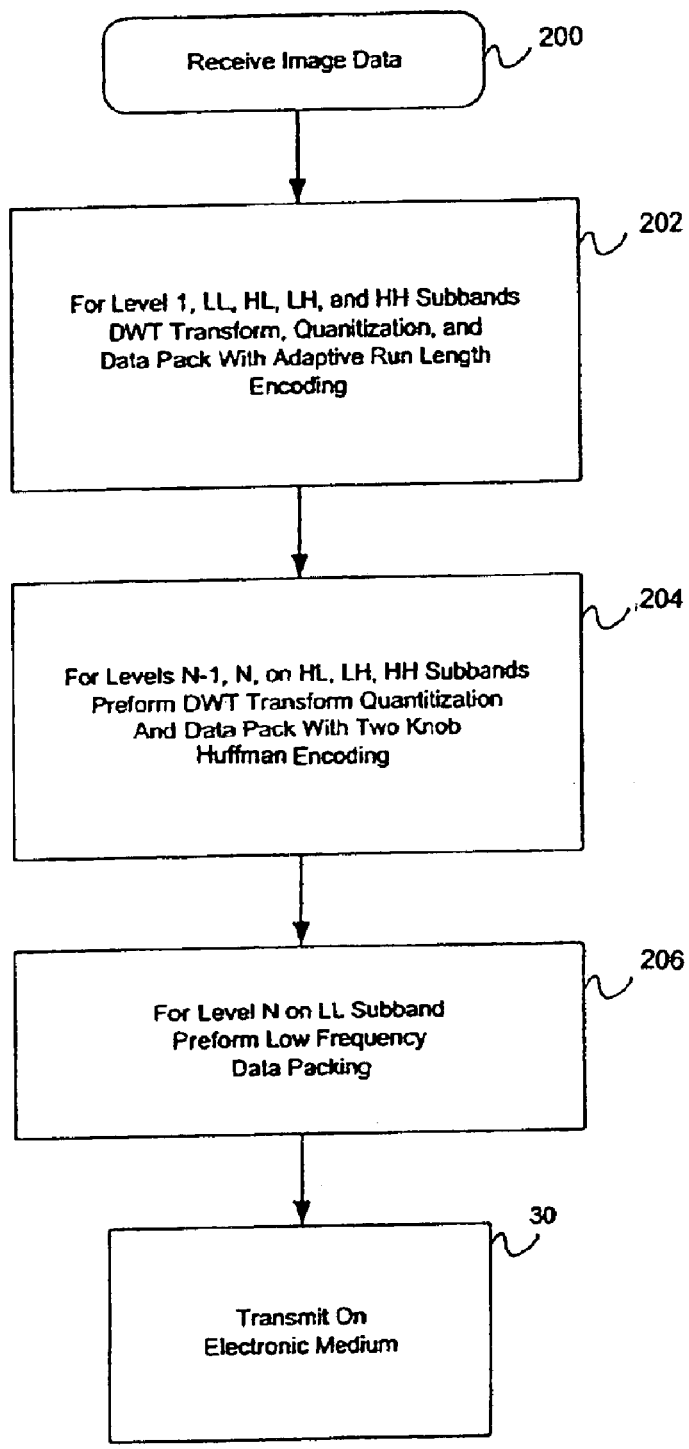
FIG. 3 is a flow chart of an embodiment of a method of compression according to the present invention.

In one embodiment of the invention, datapack step 26 includes several methods that are applied to different wavelet transform levels. FIG. 3 is a flow chart of an embodiment of a method of datapack step 26. At step 200, the image data is received. At step 202, adaptive run length coding is applied for three subbands (low-high, high-low, and high-high) at wavelet transform level one. At step 204, for additional wavelet transform levels, a two-knob Huffman data pack method is performed. At step 206, a low frequency data packing method is used for the low frequency subband of the highest wavelet level. Each of the data packing methods will be described in detail herein.

Referring to FIGS. 8–12, a method of using adaptive run length coding is illustrated. The adaptive run length coding method includes Huffman codes with run-length coding of zero coefficients. At step 300 and 302, the adaptive run length coding process is started in which the wavelet coefficient input data is scanned to find the largest coefficient magnitude. The number of bits needed to represent this coefficient is then written to the header as a four-bit word.

Figure 9A:
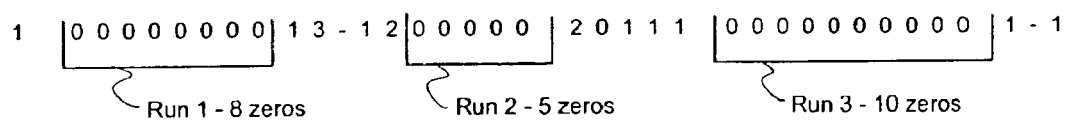
FIG. 9A is a diagram of an input data for the method in FIG. 8.
Figure 9B:
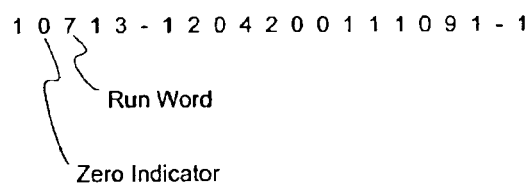
FIG. 9B is a diagram of an output data from the method in FIG. 8 according to the present invention.

At step 304, run-length coding on the zero coefficients is performed on the input data. The output of this run-length coding is a data stream consisting of non-zero coefficients and zero plus run words. A run is herein defined as the number of zeros following the first zero of a sequence of sequential zeros. A sequence of just one zero is coded as a zero followed by a zero. A sequence of ten zeros would result in a zero followed by a nine. Referring to FIGS. 9A and 9B, the input data sown in FIG. 9A includes three runs—run 1 having eight zeros, run 2 having 5 zeros, and run 3 having 10 zeros. As shown in FIG. 9B, the output data for run 1 includes a zero indicator and a run word of 7. The second run, or run 2, includes the zero indicators and a run word of 4. Shown in FIG. 12B is a representation of the data structure after run length coding in step 304. The zero indicator 524 is followed by run word 526. Run word 526 is followed by a non-zero wavelet coefficient 528. Referring to step 306, shown in FIG. 8, the output data is further compressed using a Huffman table as illustrated in FIG. 10.

Figure 11:
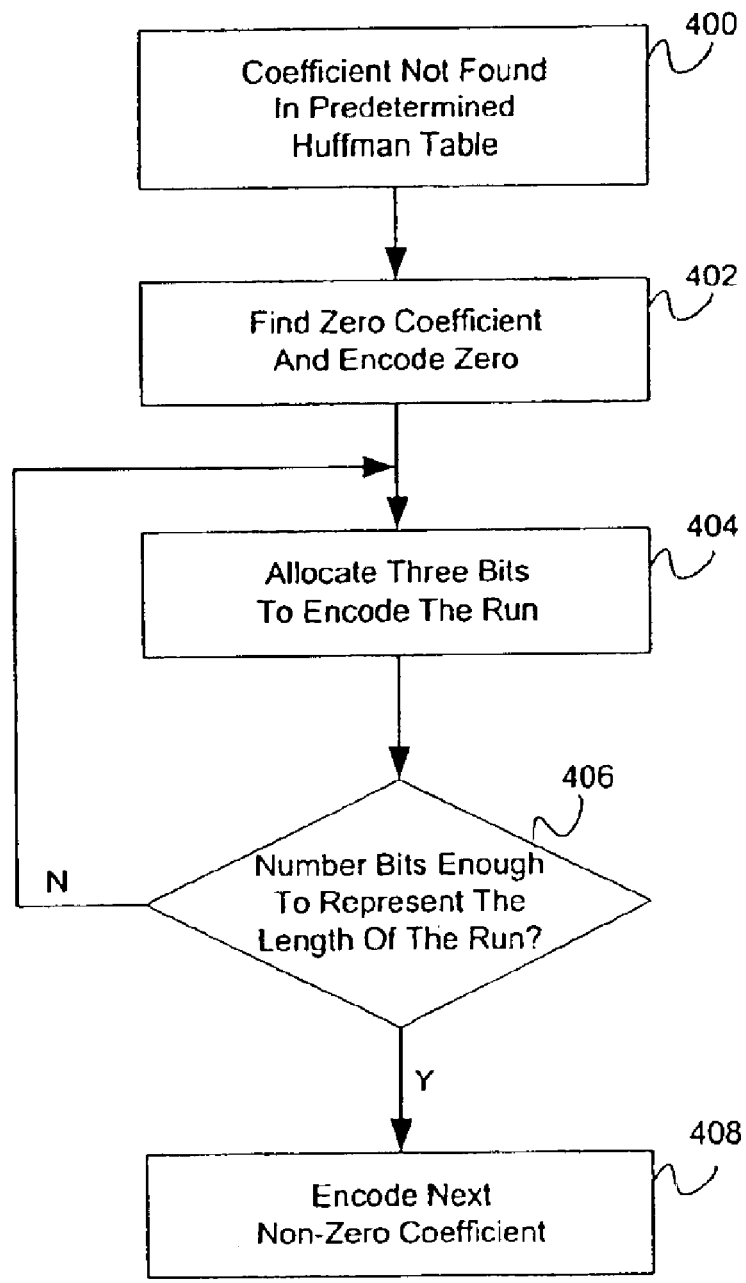
FIG. 11 is a flow chart of an embodiment of a datapacking method according to the present invention.
Figure 12A:
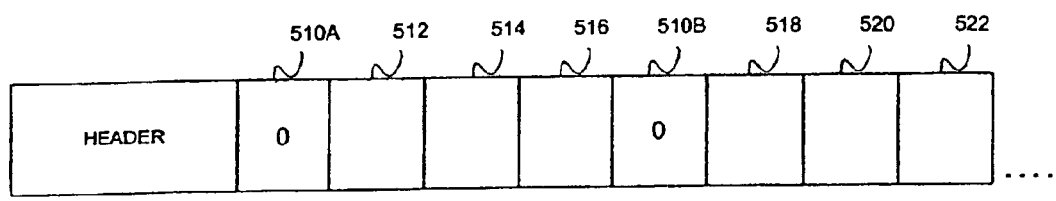
FIG. 12A is an embodiment of a data structure according to the present invention.
Figure 12B:
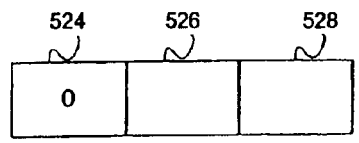
FIG. 12B is an embodiment of a second data structure according to the present invention.

FIG. 11 illustrates the data packing method of step 306 and FIG. 12A shows a data structure for encoding the runs in the output data. This data structure will be explained in the foregoing detailed description. Referring to FIG. 11, at step 400, when writing a coefficient not found in the Huffman table, an escape code is written first to a compressed datastream. Then, the coefficient is written in signed bit representation using the number of bits determined earlier in step 302. At step 402, during the encoding, if a zero is encountered, the zero is encoded first. At step 404, following the zero, three bits are allocated to writing the run. Then at step 406, the number bits needed to represent the run is determined. If three bits are not enough to write the run-length, then following these three bits, another zero is written then control is transferred to step 404. The following three bits are then allocated to writing the run-length. The procedure is continued until the run-length has been written. Then at step 408, after the run-length, the next word is the next non-zero coefficient and that next non-zero coefficient is encoded. In this coding scheme, a run is at least one in length. Therefore an encoded run is the actual run length minus 1. Given the processing speed of the computer equipment implementing the method, it is appreciated that more than three bits may be used to writing the run or equally less than three bits made be allocated to write the run both are part of the invention.

FIG. 12A illustrates a representation of the data structure after encoding a run in the present invention. There is a header element that provides information on the number of bits of the largest coefficient. Adjacent thereto may be a zero indicator element 510 representing the start of a zero run. The next data objects 512, 514 and 516 are the components that make an exponential representation wherein the sum of 512, 514 and 516 equals a power of two. Thus, if a run length of 8 needs to be encoded then data objects 512, 514 and 516 would have a one therein and the sum of 512, 514 and 516 would be equal to three. If the run length is greater than eight then the sequence is repeated. Zero indicator element 510B is again encoded and data objects 518, 520 and 522 are encoded accordingly.

The following is an example of how a run of 256 zeros is encoded—011101110110. In other words, each bit representation represents 2 raised that power. In the example of 256 zeros, the representation would be stated as $2^{1+1+1+1+1+1+1+1}$ or equivalently $2^8$.

Figure 13:
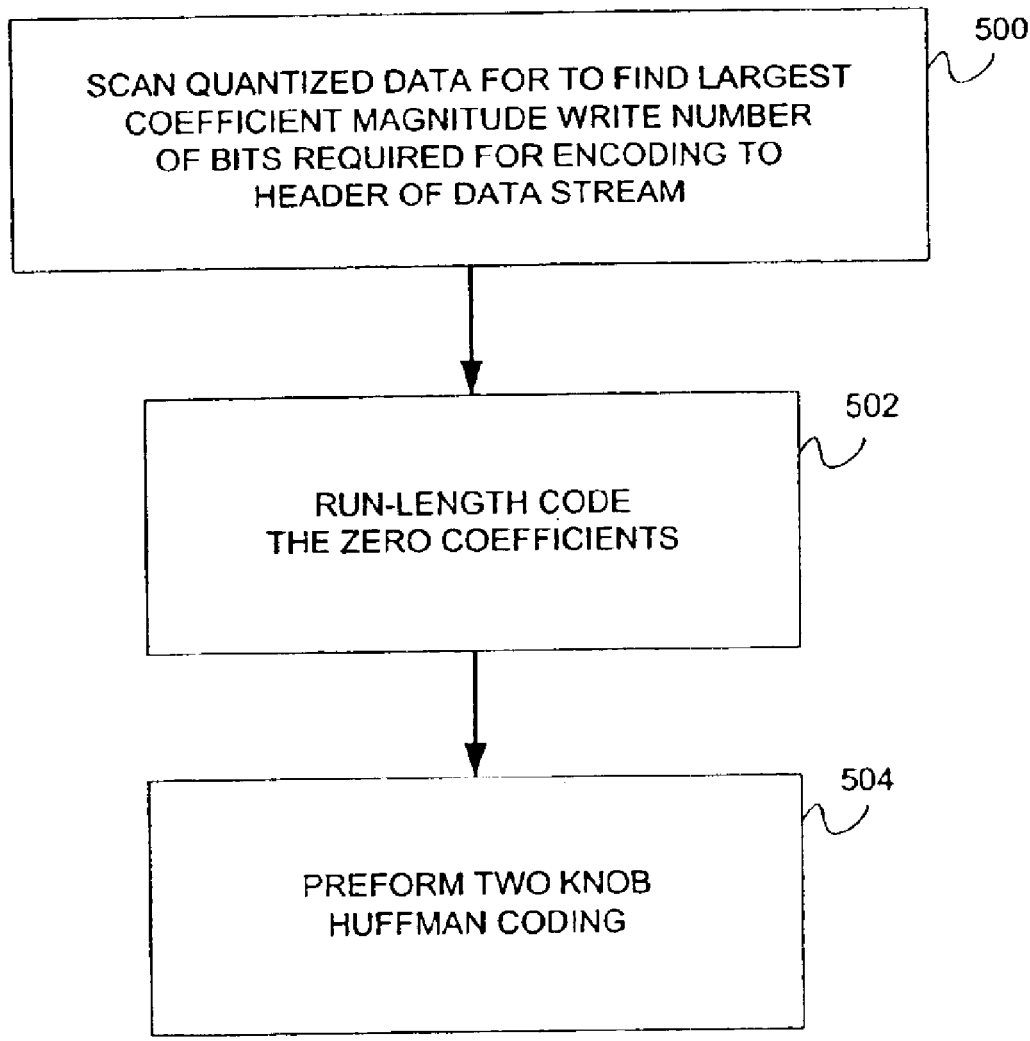
FIG. 13 is a flow chart of an embodiment of a datapacking method including two-knob huffman coding according to the present invention.

At Referring to FIG. 13, a flowchart of a datapacking method of present invention is shown including a two-knob Huffman coding algorithm. This data packing method is performed on the quantized wavelet coefficients on the high-low, low-high, and high-high quadrants of all wavelet levels other than the first level. This form of data packing is a lossless compression function that uses run-length and Huffman coding techniques.

At step 500, the dynamic range of the data is determined. The number of bits needed to code the largest valued data coefficient is then written to the header part of the data stream. As shown in step 502, the datapacking method includes performing run-length coding of the zero coefficients as was explained in step 304 shown in FIG. 8. The output of this run-length coding is a data stream consisting of non-zero coefficients, and zero plus run words. After performing the run-length coding, the function determines the longest run of zeros and the number of bits needed to code this run. This number is written to the header part of the data stream.

Then at step 504, the datastream generated from the run-length encoding is then compressed using a Huffman code. As shown in FIG. 14, a predetermined table including the Huffman code (two-knob code) has words for the most frequently occurring symbols. At step 504, encoding the non-zero coefficients is a lookup procedure based on using the Huffman code with the predetermined table. If the symbol does not have a Huffman code, then an escape code is used to code this symbol. After the escape code, a signed bit representation of the coefficient is sent to the output data stream. The number of bits used to code this coefficient was determined earlier by scanning the data set and writing the number of bits needed to the header in step 500.

The zero-runs are encoded by using a zero code word, followed by a run code word. Encoding the runs is a little more complex because there are two Huffman words used to represent at two types of runs. The two types of runs are designated herein as "long" or "short". A run is herein considered to be "long" if its length has to be coded using more than half the number of bits allotted for the longest run. A run is herein considered to be "short", if the run can be coded using half the number of bits or less allotted for the longest run. Once the encoder 20 determines if the run is "long" or "short", then the corresponding zero Huffman word is sent to the data stream. After this word, then the run is coded using the appropriate amount of bits.

In datapack step 26, a low frequency data packing method is used to compress the low-low pass quantized wavelet coefficients of the highest wavelet level. FIG. 15 shows a low-low pass subband with an indicated labeling convention. Referring to FIG. 15, the encoding process starts by locating the largest DC coefficient (DC1–DC9). The number of bits needed to code that value is determined. This bit size is written to the header as a four-bit word, and then the DC coefficients are written in unsigned bit representation using the determined number of bits.

Figure 16:
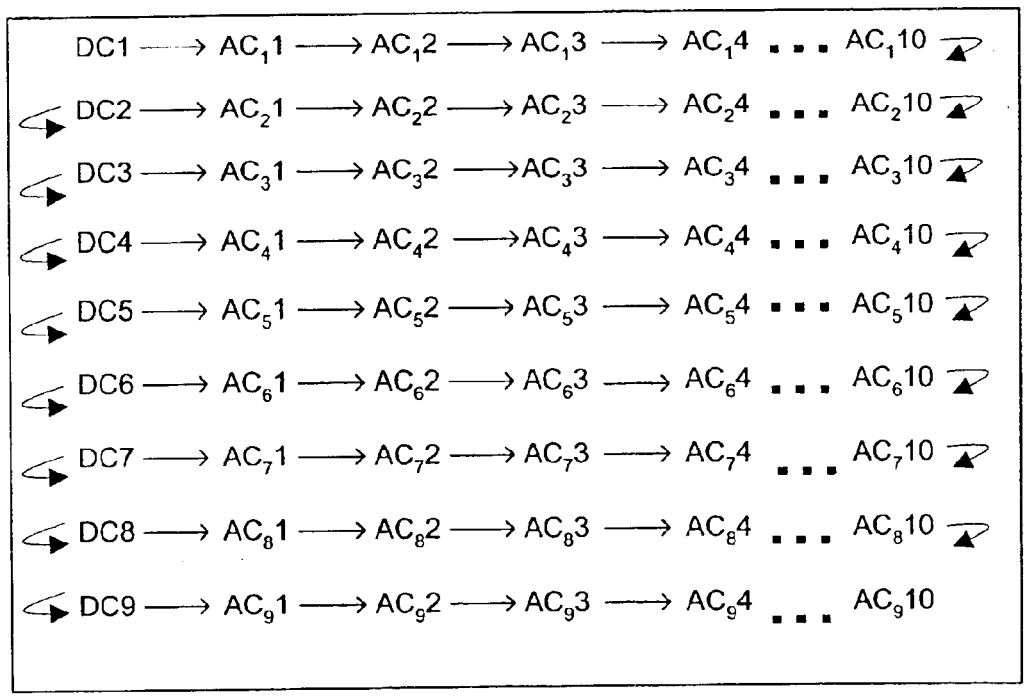
FIG. 16 is a diagram an encoding order according to the present invention.

FIG. 16 illustrates the encoding process in a row-wise manner. The differences between the coefficients in the same row are calculated. These values will be the differences between $AC_1$ and DC1, $AC_12$ and $AC_11$, . . . , $AC_1n$ and $AC_1n-1$. The maximum difference value is then located, and the number of bits needed to code this difference is written to the header as a four-bit word. Next, the differences between the coefficients in the same row are written using signed bit representation using the determined number of bits. This data is coded by storing the DC coefficients, and then the difference values for the remaining coefficients across the rows.

Figure 17:
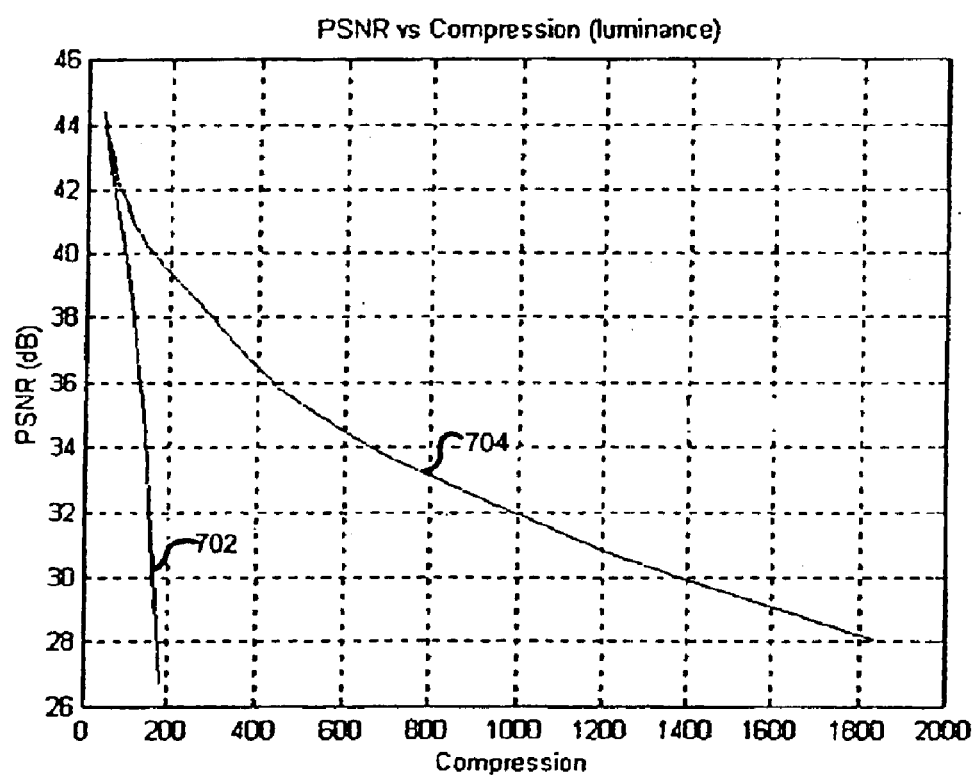
FIG. 17 is a chart of Peak Signal to Noise Ratios for different levels of compression according to the present invention.

FIG. 17 illustrates test data of a chart of the Peak Signal-to-Noise Ratio (PSNR) values for different compression levels. The Peak Signal-to-Noise Ratio is the most commonly used metric of image quality in image and video compression literature. The test image was a high resolution picture suitable for publication in a magazine. The test image was 24-bit color, 1.86×2.79 inches at 1100 dots per inch (dpi). The data file size was 18.9 Mbytes. JPEG compression (illustrated as plot 702) was compared against the apparatus and methods in accordance with the present invention (illustrated as plot 704). JPEG compression was limited to a compression level of 178:1. As a result, the blocking effect was very noticeable and image quality was inferior to the present invention.

The PSNR uses the Mean Squared Error for the mean of the sum of the squares of the differences between the values of pixels in two images. The formula for the MSE is as follows $MSE = 1/n * (Sum(i)(j)|P(i)(j) - Q(i)(j)|^2)$ where P is an original image and Q is the reconstructed one; i and j are the horizontal and locations of a pixel; P(i)(j) is the value of the pixel location (i)(j); and n is the total number of pixels for the image. The Root Mean Square Error is the square root of the Mean Squared Error in which $RMSE = Sqrt(MSE)$.

Finally, the mathematical formula for the PSNR is as follows: PSNR=10 $\text{Log}_{10}$(b/RSME) where b is the peak value for a pixel, typically 255. The PSNR is usually quoted in decibels, a logarithmic scale. PSNR is commonly used despite that it has a limited, approximate relationship with perceived errors notices by the human visual system. In general, the higher the PSNR, the higher the quality of an image. Note however, there are certain cases which can increase the PSNR without increasing the perceived image quality. An example of this is uniform image backgrounds that do not add any resolution to the region of interest.

FIGS. 18A–8C illustrate the visual quality of an image at different compression levels between conventional JPEG and the present invention. FIG. 18B was compressed and decompressed using JPEG at a compression level of 77:1. FIG. 18C was compressed and decompressed using the apparatus and methods of the present invention at a compression level of 162:1. FIGS. 19A, 19B, 19C illustrate the visual quality of an image at almost the same compression levels between JPEG and the present invention. FIG. 19B was compressed and decompressed using JPEG at a compression level of 163:1. Here the blocking effect is very noticeable. FIG. 19C was compressed and decompressed using the apparatus and methods of the present invention at a compression level of 162:1.

It is apparent the embodiment presented herein may be implemented on a general purpose computer in the form of a conventional personal computer, including a central processing unit, a system memory, and a system bus that couples various system components including the system memory to the central processing unit. The system bus may be any of several types of bus structures including a memory bus or memory controller, a peripheral bus, and a local bus using any of a variety of bus architectures. The system memory includes read only memory ("ROM") and random access memory ("RAM").

It is appreciated that present invention can process digital image data for video applications. The method can be employed in real time video capture systems using real-time or off-line compression. In one embodiment, the method is applied in a video system capturing a sequential series of still images. These images can be considered frames as similarly founded in motion picture film. Color images consist of three color components, a red component, R, a green component G, and a blue component, B. To process color images efficiently these components can be transformed into luminance, Y, and chrominance, U and V, components by using the following color transformation equations.

$$Y=R*0.299+G*0.587+B*0.114$$

$$U=-R*0.169-G*0.332+B*0.081$$

$$V=R*0.500-G*0.419-B*0.081$$

This transformation is typical in color image compression because the human visual system is more sensitive to the luminance component than the chrominance components. Therefore, one embodiment of the present invention can reduce the resolution of the chrominance components by decimation of a factor of two without loss of image quality. This results in the image being processed with full resolution luminance, and quarter sized chrominance, or 4:2:0 format. This advantageously, reduces the storage capacity and higher bandwidths for transmitting digital video data.

The methods can be embodied a computer program product in a computer usable medium, such as a floppy drive, optical disk, or magnetic hardware drive. The computer usable medium includes computer readable code that causes a computer to execute a series of steps. The computer readable code may be stored on a server connected to a public switched telecommunication network, such as the Internet including the World Wide Web.

While the invention has been describes with reference to embodiments, it will be understood by those skilled in the art that various changes may be made and equivalents may be substituted for elements thereof without departing from the scope of the invention. In addition, many modifications may be made to adapt a particular situation to the teachings of the invention without departing from the scope thereof. Therefore, it is intended that the invention not be limited to the particular embodiment disclosed, but that the invention will include all embodiments falling within the scope of the appended claims.

What is claimed is:

1. A method for image compression comprising the steps of:
   recursively transforming an image using Discrete Wavelet Transform to create a plurality of levels including at least a first level, multiple intermediate levels, and a low-low pass subband level;
   quantizing the transformed image at each level; and
   datapacking the quantized image by:
      encoding the first level using adaptive run length coding of zero coefficients;
      encoding at least one of the multiple intermediate levels using run-length coding of zero coefficients and a predetermined two-knob Huffman table for non-zero coefficients; and
      encoding the low-low pass subband level using a low frequency packing algorithm.

2. The method of claim 1, wherein the step of encoding the first level further comprises the steps of:
   scanning the quantized image to find a largest coefficient magnitude;
   storing the largest non-zero coefficient magnitude in a header;
   run-length coding the zero coefficients in the quantized image; and
   encoding the non-zero coefficients using a predetermined Huffman table.

3. The method of claim 2, wherein the step of encoding the first level further comprises the steps of:
   if a non-zero coefficient is not found in the predetermined Huffman table, encoding an escape code and encoding the non-zero coefficient in a signed bit representation.

4. The method of claim 3, wherein the step of encoding the first level further comprises the steps of:
   encoding a run in the quantized image by using three bits; and
   if three bits are insufficient to write the run, encoding a zero codeword.

5. The method of claim 1, wherein the step of encoding at least one of the multiple intermediate levels further comprises the steps of:
   scanning the quantized image after run-length coding of the zero coefficients to find the longest run; and
   storing the longest run.

6. The method of claim 5, wherein the step of encoding at least one of the multiple intermediate levels further comprises the step of:
   determining a long run or a short run based on the magnitude of the longest run.

7. The method of claim 1, wherein the step of encoding the low-low pass subband level using the low frequency algorithm includes the step of:

calculating a difference between a plurality of DC coefficients and a plurality of AC coefficients, thereby defining a plurality of DC difference values.

8. The method of claim 7, further comprising the step of:

writing the DC coefficients and the DC difference values to an encoded data stream in unsigned bit representation in a row-wise manner.

9. A method for image compression comprising the steps of:

recursively transforming an image using Discrete Wavelet Transform to create a plurality of levels;

quantizing the transformed image at each level; and encoding the quantized image at a first level using adaptive run-length coding of zero coefficients, a second level using run-length coding of zero coefficients and a predetermined two-knob Huffman table for non-zero coefficients, and a third level using low frequency coding.

10. An encoder for compressing image data comprising:

a two-dimensional discrete wavelet filter for transforming the image data into a plurality of coefficients forming a first level, multiple intermediate levels, and a low-low pass subband level;

a quantizer for mapping the coefficients into discrete regions by a predetermined compression parameter; and a datapacker for compressing the mapped coefficients wherein the datapacker encodes a plurality of zero coefficients at the first level by adaptive run length coding, encodes a plurality of non-zero coefficients at one or more of the intermediate levels by a two-knob Huffman coding, and encodes the low-low pass subband level by low frequency coding.

11. The encoder of claim 10, wherein the datapacker is adapted to:

scan the mapped coefficients of the first level to find a largest coefficient magnitude;

store the largest non-zero coefficient magnitude in a header; and run-length code the zero coefficients.

12. The encoder of claim 11, wherein the datapacker encodes the non-zero coefficients of the first level using a predetermined Huffman table after run length coding of the zero coefficients.

13. The encoder of claim 12, wherein the datapacker encodes a run of zero coefficients of the first level by writing a zero indicator followed by a predetermined number of data elements.

14. The encoder of claim 13, wherein the datapacker encodes an additional zero indicator at the first level if the predetermined number of data elements are insufficient to write the run.

15. The method of claim 13, wherein the third packing algorithm includes:

low-frequency differential datapacking of a plurality of coefficients on a row-wise fashion, including a DC coefficient.

16. The encoder of claim 10, wherein the datapacker encodes a difference between a plurality of DC coefficients and a plurality of AC coefficients at the low-low pass subband level.

17. A computer readable medium having a program for performing image compression, the program being adapted to:

recursively transform an image using Discrete Wavelet Transform to create a plurality of levels including at least a first level, multiple intermediate levels, and a low-low pass subband level;

quantizing the transformed image at each level; and datapacking the quantized image by:

encoding the first level using adaptive run length coding of zero coefficients;

encoding at least one of the multiple intermediate levels using run-length coding of zero coefficients and a predetermined two-knob Huffman table for non-zero coefficients; and encoding the low-low pass subband level using a low frequency packing algorithm.

18. A method for compressing a digital image data set comprising the steps of:

performing a plurality of two-dimension discrete wavelet transformations on the data set, wherein the plurality of transformations includes a first level, a plurality of intermediate levels, and a low-low pass subband level;

quantizing the plurality of transformations;

datapacking the quantized first level using a first packing algorithm;

datapacking at least one of the plurality of quantized intermediate levels using a second packing algorithm; and datapacking the low-low pass subband level using a third packing algorithm.

19. The method of claim 18, wherein the first packing algorithm includes:

adaptive run-length coding of a plurality of zero coefficients.

20. The method of claim 18, wherein the second packing algorithm includes:

run-length coding of a plurality of zero coefficients; and two-knob Huffman coding of a plurality of non-zero coefficients.

21. A method for compressing image data comprising the steps of:

encoding using adaptive run-length coding of zero coefficients for a first level of a transformation of the image data;

encoding using run-length coding of zero coefficients and a predetermined two-knob Huffman coding of non-zero coefficients for a second level of the transformation of the image data; and encoding using a low frequency packing algorithm for a third level of the transformation of the image data.

* * * * *